US006945333B1

(12) United States Patent
Drost et al.

(10) Patent No.: US 6,945,333 B1
(45) Date of Patent: Sep. 20, 2005

(54) CONVERTIBLE REAR-TINE TILLER

(75) Inventors: Jason A. Drost, Rice Lake, WI (US); Jonathan J. Chartraw, Cumberland, WI (US)

(73) Assignee: Ardisam, Inc., Cumberland, WI (US)

( * ) Notice: Subject to any disclaimer, the term of this patent is extended or adjusted under 35 U.S.C. 154(b) by 0 days.

(21) Appl. No.: 10/823,828

(22) Filed: Apr. 14, 2004

(51) Int. Cl.[7] .............................................. A01B 33/00
(52) U.S. Cl. ....................................................... 172/42
(58) Field of Search ........................ 172/13–17, 41–43, 172/60, 112, 125, 253; 74/11, 15.6, 355, 74/377, 532–551; 180/6.2, 6.24

(56) References Cited

U.S. PATENT DOCUMENTS

| | | | | |
|---|---|---|---|---|
| 4,286,670 | A * | 9/1981 | Ackerman | 172/42 |
| 5,287,770 | A * | 2/1994 | Mudd | 74/606 R |
| 5,520,253 | A * | 5/1996 | Kesting | 172/125 |
| 5,896,931 | A * | 4/1999 | Roberts et al. | 172/42 |
| 6,643,959 | B2 * | 11/2003 | Jolliff et al. | 37/244 |
| 6,644,416 | B2 | 11/2003 | Teeple | |

OTHER PUBLICATIONS

Ardisam, Inc., EQ Catalog Gatefold spreads; Jan. 24, 2002, 2 pgs.
Ardisam, Inc., brochure, pp. 3-10, no date.

* cited by examiner

*Primary Examiner*—Robert E Pezzuto
(74) *Attorney, Agent, or Firm*—Gerald E. Helget; Nelson R. Capes; Briggs and Morgan, P.A.

(57) ABSTRACT

A rear-tine roto-tiller with a chassis having a forward end and a rearward end; a set of rotating tines at the rearward end; a set of ground-engaging wheels between the forward end and the tines; and a tine transmission mounted on a substantially vertical shaft at the rearward end with a substantially horizontal shaft holding the tines. The tine transmission is rotatable about the vertical shaft between a first position in which the tines rotate in the same direction as the wheels and a second position in which the tines rotate in a direction opposite the direction of rotation of the wheels, thus allowing easy conversion between SRT mode and CRT mode.

14 Claims, 7 Drawing Sheets

CONVERTIBLE REAR-TINE TILLER

BACKGROUND OF THE INVENTION

1. Field of the Invention

This invention relates to lawn and garden equipment and more particularly to a rear-tine tiller which is convertible to selectively operate in both SRT and CRT modes.

2. Background Information

Several types of garden tillers exist for performing various tilling operations in gardens, flowerbeds, lawns and the like. Examples of these types include rear tine SRT ("standard rotating tine") tillers, rear tine CRT ("counter rotating tine") tillers and front tine tillers, also commonly referred to as cultivators. While each of these devices will till the earth, each particular construction is optimized for discrete operating conditions or operations.

One type of tiller is known as a rear tine SRT tiller. This machine typically includes power driven drive wheels, power driven tines and a handle which extends over the tines. Thus, during operation, the tines are located between the drive wheels and the operator. The designation SRT indicates that the tines rotate in the same forward direction as the drive wheels and thus cooperate with the wheels to propel the tiller forwardly. These types of tillers are best suited for tilling previously tilled soil or light sandy soil. SRT tillers are also very well suited for power composting.

Rear tine SRT tillers are not however, without their drawbacks. In particular, these machines are not particularly well suited for tilling hard soil, as the tines tend to skip and till only to a very shallow depth. In addition, they tend to be cumbersome and difficult to maneuver in tight areas, such as around existing plants or other obstacles.

Another type of tiller is known as a rear tine CRT tiller. This machine is structurally similar to the rear tine SRT tiller, with the exception that the tines rotate in the opposite direction, namely, opposite to the direction of rotation of the drive wheels. This construction solves some of the problems associated with the SRT tiller described hereinabove, namely, the tines penetrate to a deep depth even in hard soil or soil which has not been tilled previously. A general disadvantage however, of this approach is that the drive wheels tend to lose traction relative to the deep digging "counter rotating" tines. As a result, the tiller may stop moving forward or may even be pulled rearward against the forward pull of the drive wheels. Consequently, such tillers are generally very large and heavy, commonly in excess of 200 pounds, to provide the wheels with sufficient traction to consistently overcome the rearward pull of the tines. A drawback of such large machines however, is that they can be inefficient and cumbersome to operate for relatively light duty tilling, such as home garden use or other small area tilling. CRT tillers are also not suited for power composting.

A further type of tiller is known as a front tine tiller or cultivator. Such a machine typically includes a pair of non-driven wheels, power driven tines and a handle which extends over the wheels. During operation, the wheels are located between the tines and the operator and the tines rotate in the forward direction to propel the tiller forwardly. This type of tiller tends to be highly maneuverable and ideally suited for relatively light duty operations such as tilling small areas or areas between and around plants or other obstacles. The front tine tiller however, is not the best choice for routine tilling operations since the wheels trail the tines and therefore tend to leave tracks or ruts in the freshly tilled earth.

Rather than necessitate owning a separate machine for each of the above described tilling operations, it is desirable to have a single machine capable of operating effectively in more than one mode. For example, it would be convenient to provide a single tiller which is capable of operating in both rear tine SRT and CRT modes for effectively tilling both previously tilled earth, as well as hard packed soil. This may conceivably be accomplished by providing a reversing transmission for selectively changing the direction of rotation of the tines. A significant drawback of this approach however, is that the best performing tines tend to be unidirectional, having a preferred direction of movement through the soil. Generally speaking, such tines have convex leading edges and concave trailing edges. The convex leading edge serves to smoothly cut into and lift the soil while effectively allowing roots and grass to slide off the tine. Using a transmission to simply shift the tines into reverse rotation results in the tines moving through the soil leading with the concave, rather the convex surface. Such backwards movement is undesirable because the concave surface tends to snag and become entangled in roots, grass, and other debris. Accordingly, this approach produces an inefficient CRT tiller.

It is, therefore, desirable to provide a single tilling machine that can be quickly and easily converted by a user to both SRT and CRT tine rotation, while moving the tines through the earth only in their preferred direction of movement.

U.S. Pat. No. 5,896,931 discloses a convertible garden tiller in which the tine shaft is pivotable 180 degrees about a transverse axis, to selectively rotate the tines between an SRT mode and a CRT mode. However, the '931 patent requires the operator to loosen a fastener on the drive shaft and then rotate the tine gearbox 180 degrees in a vertical direction about the horizontal drive shaft axis, then re-tighten the fastener. As the fastener is in close proximity to the sharp tines, this has the danger of severe injury to the operator. Further, the loosened drive shaft is unsupported once the fastener is loosened, and the weight of the tines can cause the gearbox to inadvertently rotate, again presenting danger to the operator. In addition, the fastener interferes with the mechanical integrity of the drive shaft.

There is a need for a convertible tiller that is easily convertible between an SRT mode and a CRT mode without the above disadvantages.

SUMMARY OF THE INVENTION

A rear-tine roto-tiller, comprising:

(a) a chassis having a forward end and a rearward end;

(b) a set of rotating tines rotatably mounted at the rearward end;

(c) a set of ground-engaging wheels between the forward end and the tines;

d) a tine transmission mounted on a substantially vertical shaft at the rearward end and having a substantially horizontal shaft holding the tines; and (e) wherein the tine transmission is rotatable about the vertical shaft between a first position in which the tines rotate in the same direction as the wheels and a second position in which the tines rotate in a direction opposite the direction of rotation of the wheels.

A principal object and advantage of the present invention is that it provides a single machine that can be used in either standard rotating tine (SRT) mode or in counter-rotating tine (CRT) mode.

Another principal object and advantage of the present invention is that it is easily convertible between SRT mode and CRT mode.

Another principal object and advantage of the present invention is that it has an engine with a vertical drive shaft, which is less expensive than horizontal drive shaft engines.

Another principal object and advantage is that when the tiller is in SRT mode it has a shorter wheelbase. When the tiller is converted to CRT mode, the distance between the wheels and tines increases be about 4". This gives a mechanical advantage when tilling and allows for a lighter tiller to do this kind of digging. It transfers more of the tiller weight over the wheels which helps keep the wheel engaged with the ground. This helps due to the fact that when tilling in CRT mode there is a great deal of resistance pulling against the wheels. Without having the increased wheelbase in CRT mode, the tiller will have a tendency to just dig itself into a hole.

Another object and advantage of the present invention is that it has a repositionable soil penetration limiter which can be alternately used in SRT mode and CRT mode.

DETAILED DESCRIPTION OF THE PREFERRED EMBODIMENT

Figure 1:
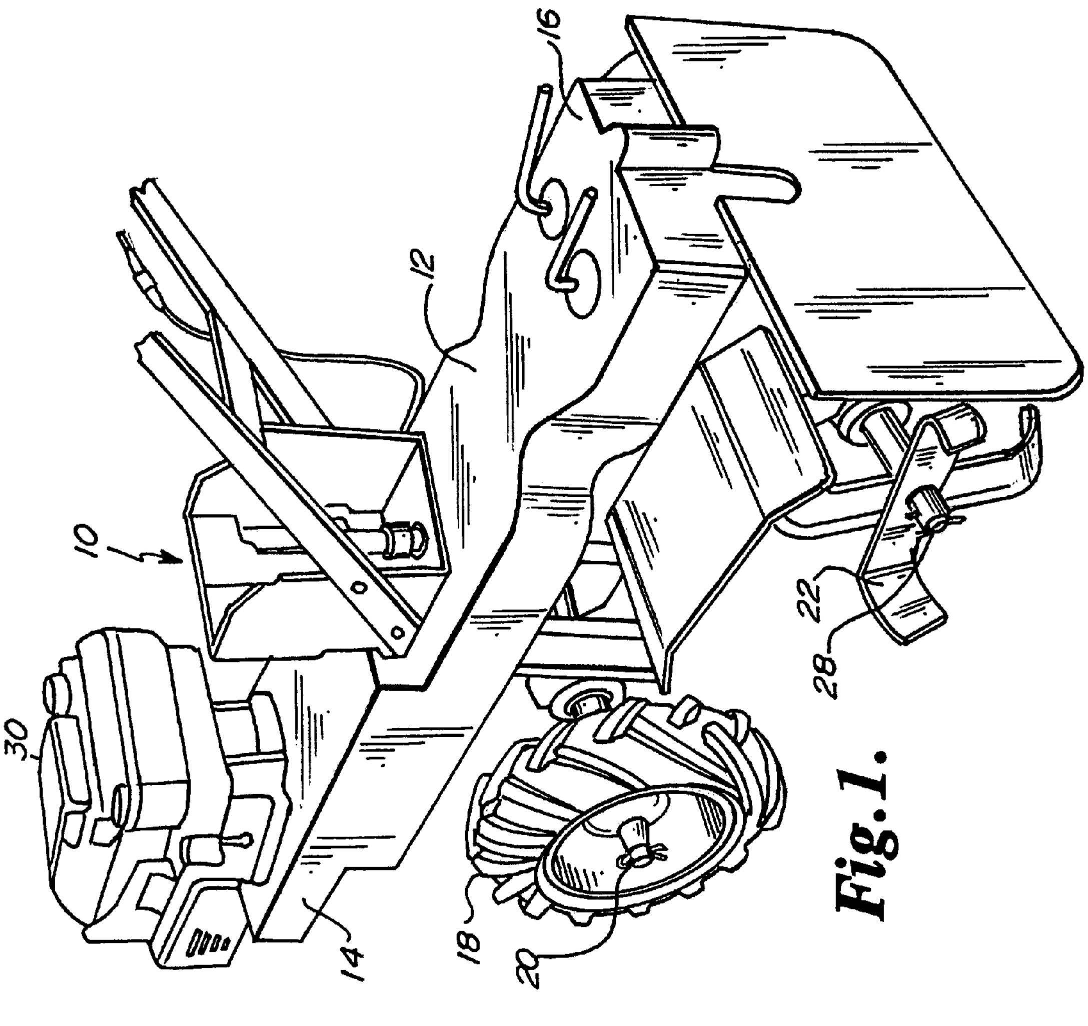
FIG. 1 is a perspective view of the present invention.

The rear-tine tiller of the present invention is generally shown in the Figures as reference numeral 10.

Turning to FIG. 1, the rear-tine tiller 10 further comprises a chassis 12 having a forward end 14 and a rearward end 16; at least one pair of ground-engaging wheels 18 supporting the chassis 12, the wheels 18 rotating about a first axis 20; and a plurality of tines 22 disposed on the chassis 12 at the rearward end 16 for working soil. The tines 22 (FIG. 2) have a leading edge 24 and a trailing edge 26 and are mounted for rotation about a tine shaft 28 that is substantially parallel to the first axis 20. The leading edge 24 penetrates the soil S before the trailing edge 26, regardless of the direction of tine shaft rotation. Preferably, the leading edge 24 is convex and the trailing edge 26 is concave. The tine shaft 28 is rotatable in a substantially horizontal plane H about a substantially vertical axis V to change the direction of rotation of the tines 22.

Figure 6:
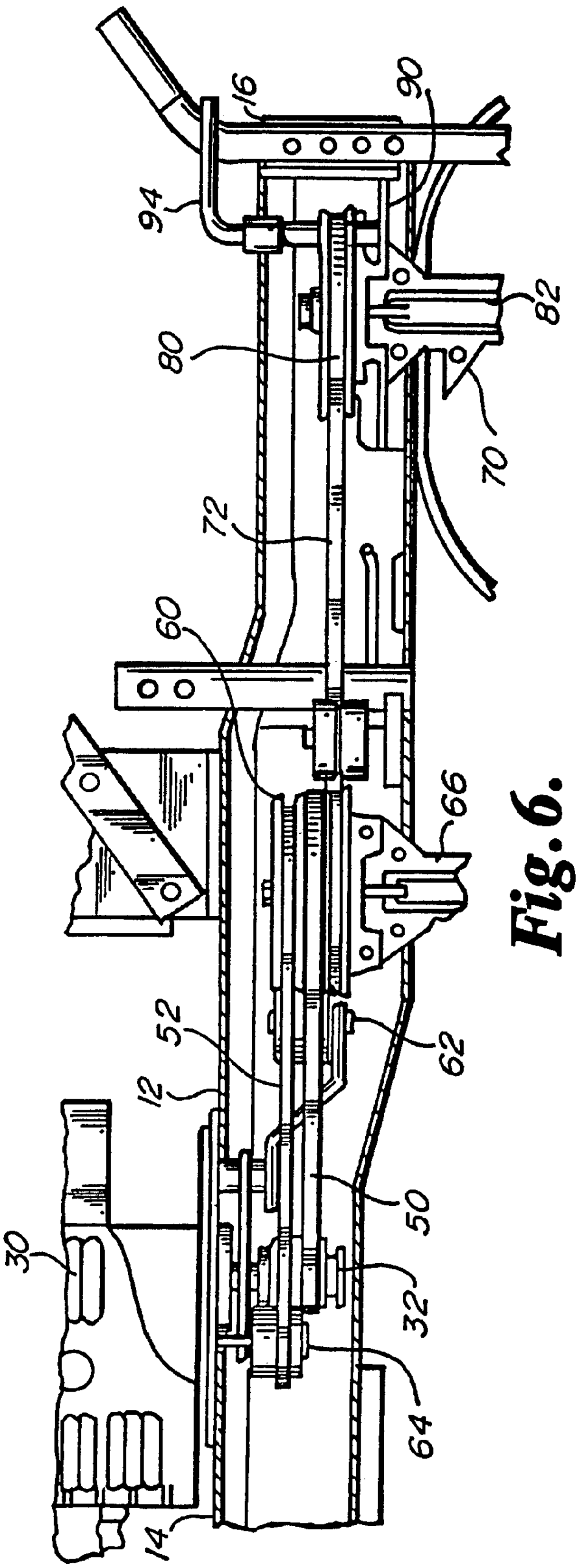
FIG. 6 is a cross-section of the present invention at approximately the lines 6 of FIG. 2.

The tiller 10 further comprises an engine 30 for driving the wheels 18 and the tines 22, the engine 30 being mounted on the chassis 12 at the forward end 14 and the engine 30 having a substantially vertically disposed drive shaft 32 (FIG. 6).

The roto-tiller 10 further preferably comprises a repositionable soil penetration limiter 40 that is movable between a first position 42 between the wheels 18 and tines 22, and a second position 44 rearward of the tines 22.

In more detail, the roto-tiller 10 is as follows.

General Configuration

Figure 2:
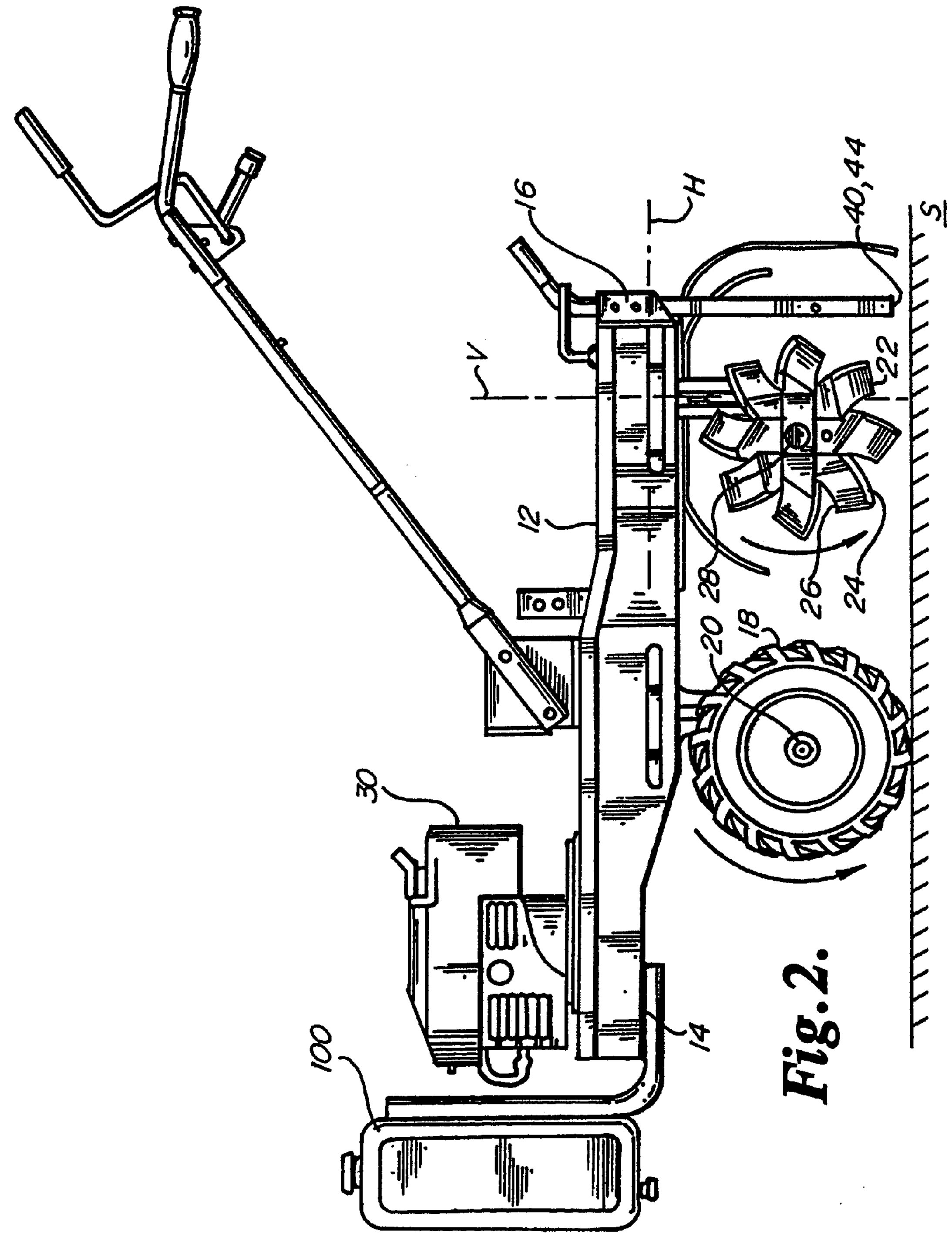
FIG. 2 is a side elevational view of the present invention configured for SRT mode.
Figure 3:
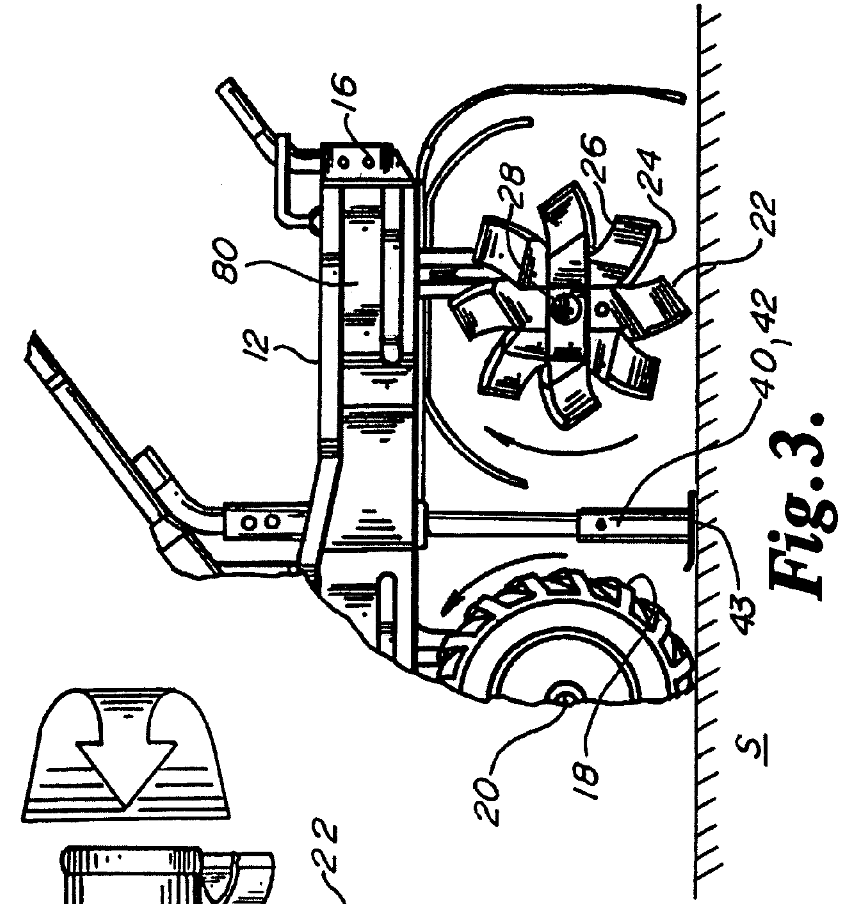
FIG. 3 is a side elevational view of the present invention configured for CRT mode.

The tiller 10 can be alternately configured in SRT mode and in CRT mode, as shown in FIGS. 2 and 3.

FIG. 2 shows the general configuration of the tiller 10 in SRT mode, in which the direction of rotation of the wheels 18 and tines 22 are shown by the arrows. It will be seen that in SRT mode, the wheels 18 and tines 22 rotate in the same direction (counter-clockwise as shown), with the leading edge 24 of the tines 22 penetrating the soil S before the trailing edge 26. The repositionable soil penetration limiter 40 is set at its rearward position 44.

FIG. 3 shows the general configuration of the tiller 10 in CRT mode, in which the direction of rotation of the wheels 18 and tines 22 are shown by the arrows. It will be seen that in CRT mode, the wheels 18 and tines 22 rotate in opposite directions, the wheels rotating counter-clockwise as shown and the tines 22 rotating clockwise as shown, with the leading edge 24 of the tines 22 penetrating the soil S before the trailing edge 26. The repositionable soil penetration limiter 40 is set at its forward position 42 to prevent the tines from digging too far into the soil S.

As will be discussed in more detail below, the tine shaft can be rotated between the position shown in FIG. 2 and that shown in FIG. 3.

Chassis, Engine and Pulley System

Figure 4:
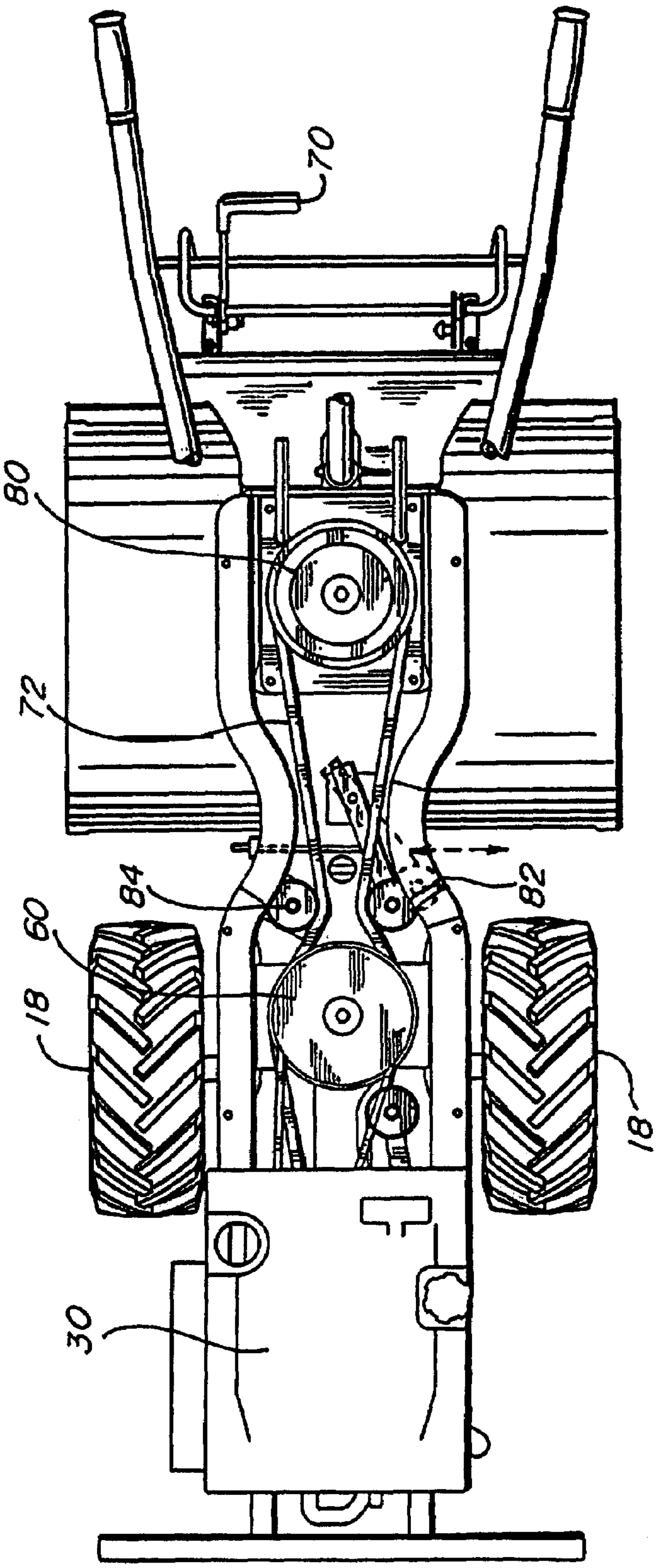
FIG. 4 is a top plan view of the present invention.
Figure 5:
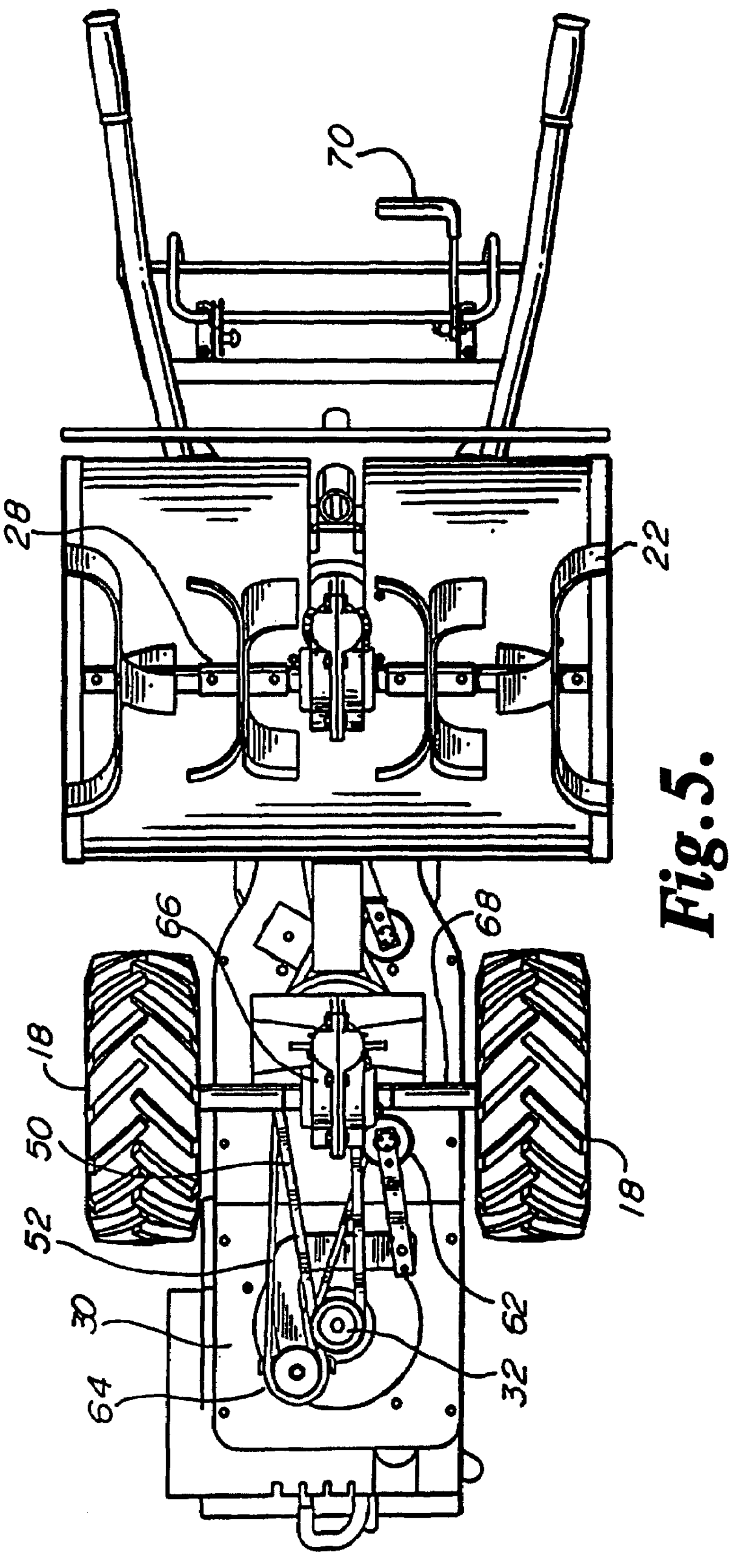
FIG. 5 is a bottom plan view of the present invention.

Turning to FIGS. 4, 5, and 6, details of the chassis, engine, and pulley system will be appreciated.

Figure 7A:
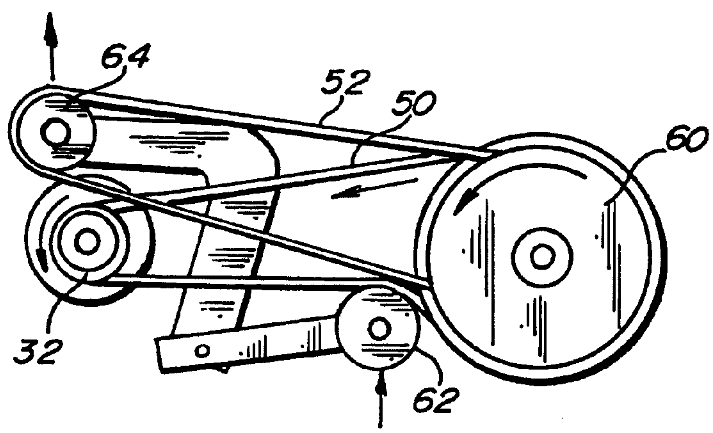
FIGS. 7A and 7B are detailed views of the drive mechanism of the present invention.
Figure 7B:
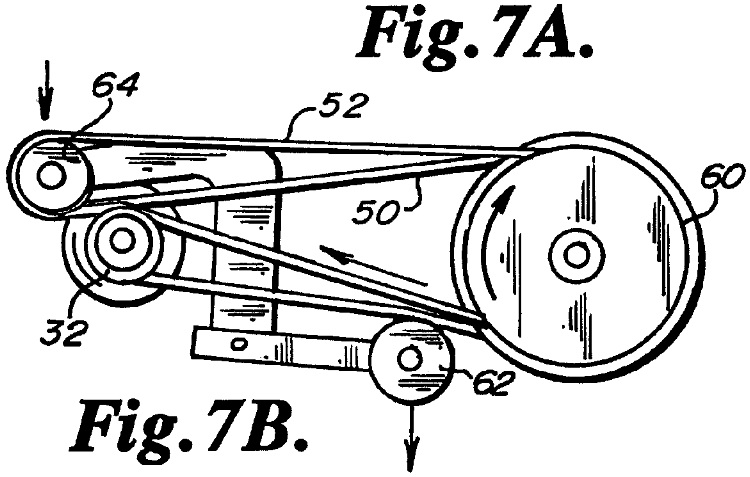

The engine 30 and drive shaft 32 are mounted on the front end 14 of the rear-tine tiller 10. The drive shaft 32 is substantially vertical and penetrates the chassis 12. Beneath the chassis 12, two belts 50, 52 frictionally engage the drive shaft 32. Wheel transmission belt 50 is engaged to the drive shaft 32 to drive the wheels 18 in a forward direction. Reversing belt 52 is engaged to the drive shaft 32 to drive the wheels in a reverse direction. As seen in FIG. 7A, in order to drive the wheels 18 forwardly, wheel transmission belt 50 is tightened against the wheel transmission pulley 60, suitably by means of adjuster 62, while reversing belt 52 is simultaneously loosened from engagement with the drive shaft 32 as for example by adjuster 64. As seen in FIG. 7B, in order to drive the wheels 18 rearward, adjuster 62 is moved away from the wheel transmission pulley 60 as shown by the arrow while simultaneously adjuster 64 tightens reversing belt 52 against the drive shaft 32 as shown by the other arrow. Wheel transmission pulley 60 then drives the wheel transmission 66, which in turn drives the wheel axle 68. Forward and reverse gearing is controlled by the lever 70, which simultaneously moves the adjusters 62 and 64 through appropriate linkages (not shown).

Preferably, the wheel transmission provides a 60:1 gear ratio relative to the engine 30. Thus, if the engine shaft 32 is rotating at 1200 rpm, the wheels will rotate at 20 rpm.

Tine Transmission

Figure 9:
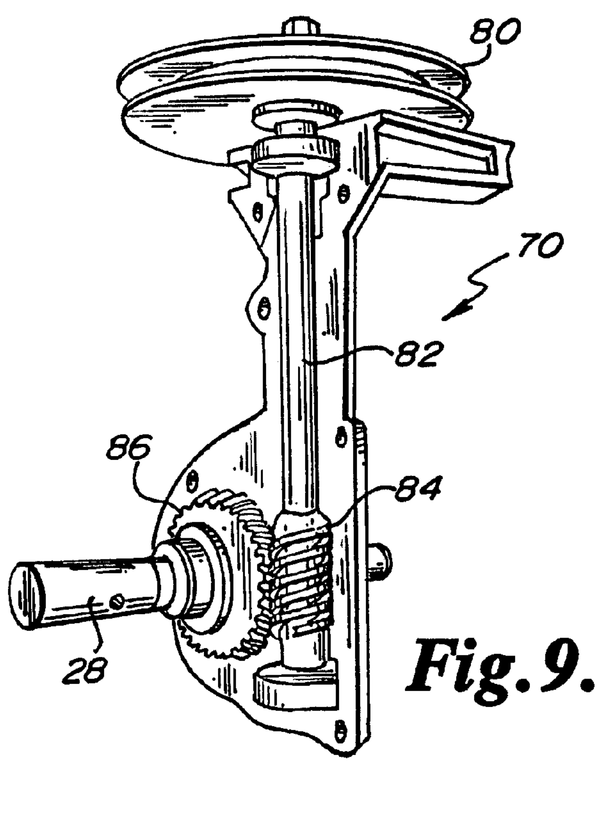
FIG. 9 is a detailed view of the tine transmission of the present invention with some structure broken away to show internal parts.

To drive the tine transmission 70, tine transmission belt 72 is frictionally engaged with the wheel transmission pulley 60, as best seen in FIG. 4. In turn, tine transmission belt 72 drives tine transmission pulley 80. As best seen in FIG. 9, tine transmission pulley 80 drives tine transmission shaft 82 which has tine transmission worm gear 84 mounted thereon. Tine transmission worm gear 84 meshes with tine shaft gear 86 mounted on the tine shaft 28, thereby turning tine shaft 28.

Referring again to FIG. 4, tine transmission belt 72 is frictionally engaged and disengaged from tine transmission pulley 80 by means of an adjuster 82, which moves in and out as shown by the dashed line. Idler wheel 84 may preferably be used to confine the path of belt 72 to the configuration of chassis 12 shown in the Figure.

Preferably, the tine transmission provides an 8:1 gear ratio between the engine 30 and the tine shaft 28. Thus if the engine drive shaft 32 is rotating at 1200 rpm, the tine shaft 28 will rotate at 150 rpm.

Changing Tine Transmission from SRT Mode to CRT Mode

Figure 8:
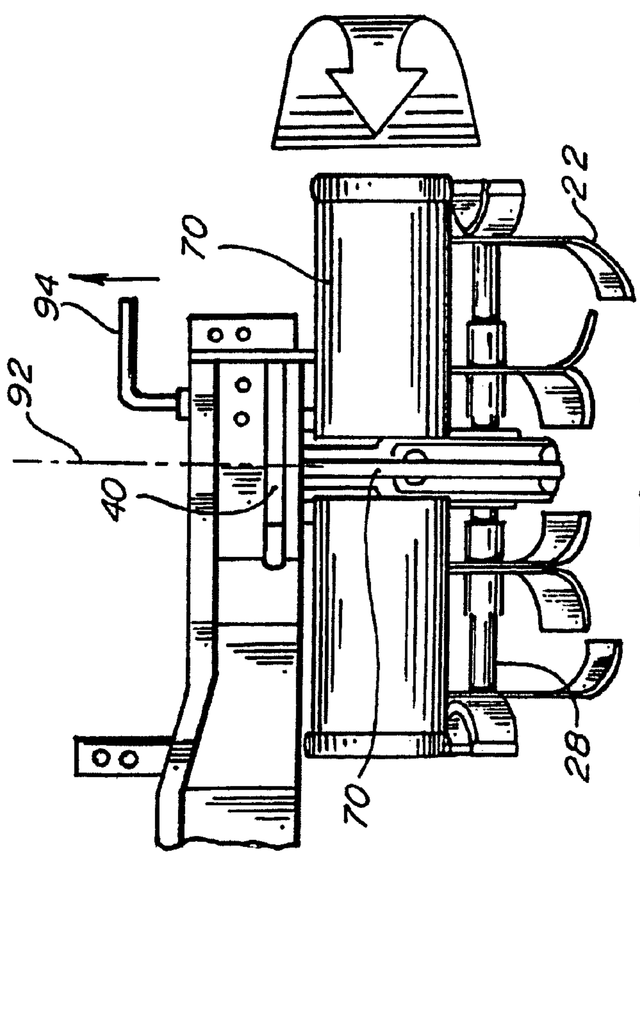
FIG. 8 is a detailed view of the tine transmission of the present invention as it is being switched from SRT mode to CRT mode.

Turning to FIG. 8, details of changing the tine transmission from SRT mode to CRT mode and reverse will now be described.

The tine transmission 70 is mounted to a substantially horizontal plate 90 that is suitably secured to the chassis 12 for rotation about a substantially vertical axis 92. The horizontal plate 90 is secured from rotation by pin 94.

To change the tine transmission from SRT mode to CRT mode, or vice-versa, the operator pulls the pin 94 upward, releasing the horizontal plate 90 for rotation about axis 92. The tine transmission 70 is then rotated 180 degrees about axis 92 as shown by the large arrow. Then pin 94 is pushed downward to again engage the horizontal plate 90 and secure it against rotation. This positioning of the tine transmission now causes the tine shaft 28 to rotate in a direction opposite to its former direction of rotation relative to the wheels. If the tine transmission was in SRT mode (FIG. 2), the tine shaft would be rotating counter-clockwise. Positioning of the tine transmission to CRT mode (FIG. 3) now causes the tine shaft to rotate clockwise.

When switching from SRT mode (FIG. 2) to CRT mode (FIG. 3), the operator also removes the soil penetration limiter 40 from its rearward position 44 and inserts it at the forward position 42. A shoe 43 may also be added to the penetration limiter 40 to further prevent undue soil penetration in CRT mode.

An optional water ballast tank 100 may be attached to the front end 14 of the tiller 10 by any suitable method, such as welding. When filled with water, the tank 100 prevents the tiller 10 from tilting backwards as the tines penetrate the soil.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A rear-tine roto-tiller, comprising:

(a) a chassis having a forward end, and a rearward end;

(b) at least one pair of ground-engaging wheels supporting the chassis, the wheels rotating about a first axis;

(c) a plurality of tines disposed on the chassis at the rearward end for working soil, the tines having a leading edge and a trailing edge and being mounted for rotation about a tine shaft substantially parallel to the first axis, wherein the leading edge penetrates the soil before the trailing edge;

(d) the direction of rotation of the tines being changeable between forward and reverse rotation; and (e) wherein the tine shaft is rotatable in a substantially horizontal plane about a substantially vertical axis to change the direction of rotation of the tines.

2. The roto-tiller of claim 1, further comprising an engine for driving the wheels and the tines, the engine being mounted on the chassis at the forward end and the engine having a substantially vertically disposed drive shaft.

3. The roto-tiller of claim 1, wherein the leading edge is concave and the trailing edge is convex.

4. The roto-tiller of claim 1, further comprising a repositionable soil penetration limiter.

5. The roto-tiller of claim 4, wherein the soil penetration limiter is movable between a first position between the wheels and the tines and a second position rearward of the tines.

6. A rear-tine roto-tiller, comprising:

(a) a chassis having a forward end and a rearward end;

(b) a set of rotating tines rotatably mounted at the rearward end;

(c) a set of ground-engaging wheels between the forward end and the tines; and (d) a tine transmission mounted at the rearward end and having a substantially horizontal shaft holding the tines;

(e) wherein the tine transmission is rotatable about a substantially vertical axis between a first position in which the tines rotate in the same direction as the wheels and a second position in which the tines rotate in a direction opposite the direction of rotation of the wheels.

7. The roto-tiller of claim 6, further comprising an engine for driving the wheels and the tines, the engine being mounted on the chassis at the forward end and the engine having a substantially vertically disposed drive shaft.

8. The roto-tiller of claim 6, further comprising a repositionable soil penetration limiter.

9. The roto-tiller of claim 8, wherein the soil penetration limiter is movable between a first position between the wheels and the tines and a second position rearward of the tines.

10. A rear-tine roto-tiller, comprising:

(a) a chassis having a forward end and a rearward end;

(b) a set of rotating tines rotatably mounted at the rearward end;

(c) a set of ground-engaging wheels between the forward end and the tines;

(d) an engine for driving the wheels and the tines, the engine being mounted on the chassis at the forward end and the engine having a substantially vertically disposed drive shaft;

(e) a tine transmission mounted at the rearward end and having a substantially horizontal shaft holding the tines; and (f) wherein the tine transmission is rotatable about a substantially vertical axis between a first position in which the tines rotate in the same direction as the wheels and a second position in which the tines rotate in a direction opposite the direction of rotation of the wheels.

11. The roto-tiller of claim 10, further comprising a water ballast tank forward of the engine.

12. The roto-tiller of claim 10, further comprising a wheel transmission driving the wheels and a wheel transmission belt frictionally engaging the drive shaft and the wheel transmission.

13. The roto-tiller of claim 12, further comprising a reversing belt frictionally engaging the drive shaft and an adjuster for alternately engaging one of the wheel transmission belt and reversing belt with the wheel transmission and drive shaft for forward and reverse motion respectively.

14. The roto-tiller of claim 12, further comprising a tine transmission belt frictionally engaging the wheel transmission and the tine transmission and an adjuster for disengaging the tine transmission belt from the tine transmission.

* * * * *